US009285224B2

(12) United States Patent
Afzal et al.

(10) Patent No.: US 9,285,224 B2
(45) Date of Patent: Mar. 15, 2016

(54) SYSTEM AND METHOD FOR GYROSCOPE ERROR ESTIMATION

(75) Inventors: Muhammad Haris Afzal, Vancouver (CA); Valerie Renaudin, Calgary (CA); Gerard Lachapelle, Calgary (CA)

(73) Assignee: UTI LIMITED PARTNERSHIP, Calgary, Alberta (CA)

( * ) Notice: Subject to any disclaimer, the term of this patent is extended or adjusted under 35 U.S.C. 154(b) by 795 days.

(21) Appl. No.: 13/440,545

(22) Filed: Apr. 5, 2012

(65) Prior Publication Data

US 2012/0259572 A1 Oct. 11, 2012

Related U.S. Application Data

(60) Provisional application No. 61/472,340, filed on Apr. 6, 2011.

(51) Int. Cl.
*G01C 21/16* (2006.01)
*G01C 25/00* (2006.01)
*G06F 17/00* (2006.01)
*G01C 21/20* (2006.01)

(52) U.S. Cl.
CPC ............ *G01C 21/165* (2013.01); *G01C 25/005* (2013.01); *G01C 21/20* (2013.01); *G06F 17/00* (2013.01)

(58) Field of Classification Search
CPC .... G01C 21/165; G01C 25/005; G01C 21/20; G06F 17/00
See application file for complete search history.

(56) References Cited

U.S. PATENT DOCUMENTS

| 6,253,154 | B1* | 6/2001 | Oshizawa et al. ............. 701/495 |
| 8,275,544 | B1* | 9/2012 | Wells et al. ................... 701/501 |
| 2004/0020064 | A1* | 2/2004 | Levi et al. ........................ 33/319 |
| 2006/0195254 | A1* | 8/2006 | Ladetto ................. G01C 17/00 701/508 |
| 2011/0066395 | A1* | 3/2011 | Judd ............................ 702/104 |
| 2011/0105957 | A1* | 5/2011 | Kourogi et al. ............... 600/595 |
| 2011/0167893 | A1* | 7/2011 | Frey, Jr. ......................... 73/1.77 |
| 2012/0217958 | A1* | 8/2012 | Oka et al. ...................... 324/244 |

OTHER PUBLICATIONS

Chang et al., "An Integrated MEMS Gyroscope Array with Higher Accuracy Output" Sensors 2008, 8, 2886-2899.*
Lai et al., "Real-Time Attitude-Independent Gyro Calibration from Three-Axis Magnetometer Measurements" AIAA/AAS Astrodynamics Specialist Conference and Exhibit Aug. 16-19, 2004, Providence, Rhode Island.*
Sabatini, "Quaternion-Based Extended Kalman Filter for Determining Orientation by Inertial and Magnetic Sensing" IEEE Transactions on Biomedical Engineering, vol. 53, No. 7, Jul. 2006.*

(Continued)

*Primary Examiner* — Alexander Satanovsky
*Assistant Examiner* — John Kuan
(74) *Attorney, Agent, or Firm* — Brion Raffoul

(57) ABSTRACT

Methods and systems for compensating for gyroscopic errors. A system uses magnetometers to detect and measure a magnetic field local to a personal navigation device. When the local magnetic field is quasi-static, the rate of change of the magnetic field is combined with the rotational rate of change of the device. This generates an estimated gyroscope error. The error can then be used to correct for time-varying inherent gyroscope errors.

15 Claims, 12 Drawing Sheets

(56) References Cited

OTHER PUBLICATIONS

Renaudin et al., "Complete tri-axis magnetometer calibration in the magnetic domain," *Journal of Sensores, Hindawi*, vol. 2010, p. 1-10, 2010.

Bancroft et al., "High Performance GNSS Augmented Pedestrian Navigation in Signal Degraded Environments," in *International Global Navigation Satellite Systems Society (IGNSS) Symposium 2011*, Sydney, Australia, 2011, p. 1-14.

* cited by examiner $x = [\epsilon \ b_\omega]^T$ is the state vector, $\omega$ is the angular rate vector, B is the magnetic field vector,
$\epsilon$ is the attitude error vector, $b_\omega$ is gyroscope bias vector,
$F_{b,qs}$ is the magnetic field vector in the beginning of quasi-static period,
$F_2^b$ is the magnetic field vector during quasi-static period

SYSTEM AND METHOD FOR GYROSCOPE ERROR ESTIMATION

RELATED APPLICATIONS

This application claims priority on U.S. Patent Application Ser. No. 61/472,340 filed Apr. 6, 2011.

TECHNICAL FIELD

The present invention relates to gyroscope assisted navigation. More specifically, the present invention relates to methods and systems for determining and compensating for time varying gyroscope errors.

BACKGROUND OF THE INVENTION

The increasing popularity of smartphones and the increasing number of features of such phones has led to the incorporation of navigation assisting features in these devices. In addition to the proliferation of such smartphones, the popularity of personal (or portable) navigation devices has also increased. This proliferation of such portable navigation devices has led to cheaper and cheaper devices, with cheaper and cheaper components.

Estimating the orientation of a Portable Navigation Device (PND) is commonly achieved using onboard inertial sensors, i.e. rate gyroscopes and accelerometers. When these sensors are of low cost consumer grade, they suffer from time varying errors that require specific mitigation methods.

Global Navigation Satellite System (GNSS) is often the most effective technology to compensate for sensor errors. However this approach is only effectively feasible if the GNSS signals are not degraded by environmental and man-made factors. Because pedestrian navigation based on PND occurs mainly in signal degraded environments such as inside buildings and along city streets, it is not feasible to rely only on GNSS technology to estimate the sensor errors. Man-made electronic interference caused by wireless devices operating near GNSS frequencies can also adversely affect signal acquisition and tracking, both outdoor and indoor. Interference sources include anti-spoofing and intentional and unintentional jamming. Complementary techniques consist in taking advantage of a specific known IMU location on the pedestrian's body to mitigate the IMU sensor errors. For example when the IMU is located on the foot, it is possible to constrain the velocity of the navigation solution during the stance phase leading to the estimation of inertial sensor errors. When the Inertial Measurement Unit (IMU) location is not body fixed, i.e. not rigidly attached to the pedestrian's body, as in the case of a mobile phone for example, there exists no similar technique to constrain the error growth in the navigation solution. In PND-based navigation applications, the IMU location is generally not fixed to the body but is in a hand, a side pocket, a purse etc, which leads to alternative error mitigation methods.

Based on the above, there is therefore a need for systems and methods which mitigate the issues presented above and which address the same issues.

SUMMARY OF INVENTION

The present invention provides methods and systems for compensating for gyroscopic errors. A system uses magnetometers to detect and measure a magnetic field local to a personal navigation device. When the local magnetic field is quasi-static, the rate of change of the magnetic field is combined with the rotational rate of change of the device. This generates an estimated gyroscope error. The error can then be used to correct for time-varying inherent gyroscope errors.

In a first aspect, the present invention provides a method for compensating for errors in a mobile gyroscope in a device, the method comprising:
 a) determining a rotational rate of change of said device around at least one axis;
 b) determining an overall magnetic field vector of a magnetic field local to said device;
 c) determining a rate of change of said magnetic field field vector;
 d) determining if said magnetic field is unchanging;
 e) in the event said magnetic field is unchanging, generating estimated gyroscope errors using said rate of change of said magnetic field vector and said rotational rate of change of said device;
 f) compensating for said gyroscope errors using said estimated gyroscope errors.

In a second aspect, the present invention provides computer readable media having encoded thereon computer readable instructions which, when executed, implements a method for compensating for errors in a handheld gyroscope in a device, the method comprising:
 a) determining a rotational rate of change of said device around at least one axis;
 b) determining an overall magnetic field vector of a magnetic field local to said device;
 c) determining a rate of change of said magnetic field field vector;
 d) determining if said magnetic field is unchanging;
 e) in the event said magnetic field is unchanging, generating estimated gyroscope errors using said rate of change of said magnetic field vector and said rotational rate of change of said device;
 f) compensating for said gyroscope errors using said estimated gyroscope errors.

In yet a further aspect, the present invention provides a method for determining errors in a gyroscope in a non-static device, the method comprising:
 a) determining at least two periods of time when a total local magnetic field is unchanging;
 b) for each of said at least two periods of time, determining a magnetic field vector for said magnetic field;
 c) for each of said at least two periods of time, determining a rotational rate of change for said device;
 d) using an extended Kalman filter to estimate errors in readings from said gyroscope using said magnetic field vector determined in step b) and said rotational rate of change for said device.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
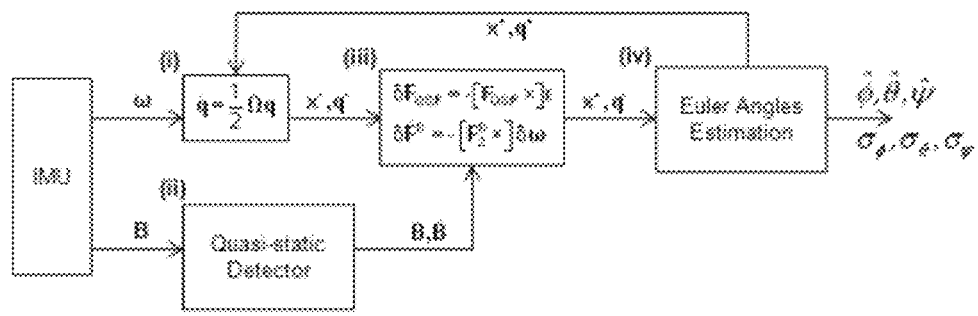
FIG. 1 is a block diagram illustrating the various components of one aspect of the invention.

In one aspect, the present invention utilizes the magnetic field sensed by the PND in the IMU frame, during the periods when it is assessed as quasi-static, for estimating MEMS gyroscope errors. The latter is achieved by using an Extended Kalman Filter (EKF) based attitude estimation method.

The quasi-static magnetic field detector is developed using statistical signal processing techniques. A Kalman filter is then realized, which utilizes the quasi-static magnetic field for attitude and sensor error estimation. Results show that there exist periods during pedestrian motion when the perturbed magnetic field is constant (static) locally and this field can be effectively used for constraining the attitude errors and estimating the gyro sensor biases. Results also show significant improvements in gyroscope bias estimation using this approach thus allowing the use of consumer grade MEMS gyroscopes for attitude estimation in pedestrian navigation environments.

In order to navigate using a PND, two pieces of information are necessary: the displacement between two time epochs, referred to as a time interval, and the corresponding changes of PND orientation during that interval. In one aspect, the present invention addresses the estimation of orientation changes. Rate gyroscopes are the primary sensors for tracking orientation changes but they suffer from time varying errors that bias the orientation estimation. The present invention enables the correction for these biases in real time using a quasi-static magnetic field. A quasi-static magnetic field (QSF) period is a time interval during which the measured magnetic field is not changing or is time invariant. Artificial magnetic perturbation will not impact the process as long as the magnetic field is constant. The process is therefore immune to local magnetic perturbations, rendering it usable in any kind of pedestrian navigation environment where other existing methods fail. One can visualize a QSF period to be a zero slope of the field's magnitude versus time. This detection process measures the trend of the field's magnitude in time, testing whether the deviation is within the noise bounds or has changed due to external perturbations.

To explain the theory behind one aspect of the invention, let us imagine a device rotating in a space where there is a constant force, which can be sensed by magnetic sensors. This force can be either the Earth's magnetic field or the Earth's magnetic field perturbed by other forces such as nearby ferrous material. If this force is measured at two different epochs and the device has been rotated between these two epochs, the difference of the field measurements translates the rotation of the device in that space during the corresponding time interval. This difference is given by the rate of change of the local magnetic field sensed by magnetic field sensors, namely magnetometers, in a frame attached to the device. When the local magnetic field is known to be static, constant, or quasi-static, the difference can be used to calibrate the gyroscopes, thereby compensating for any errors in the gyroscope.

One implementation of the invention involves the use of a dedicated navigation filter. The aim of this filter is to produce the best possible estimate of the orientation of the device relative to a frame attached to a geographical map using rate gyroscopes and magnetometers. The latter frame is called a Local Level Frame (LLF). The gyroscope measurements are corrupted by systematic errors due to fabrication limitations. Unfortunately some of these errors are time varying and cannot be calibrated a priori. The magnetometer measurements are also corrupted by sensor errors but they can be calibrated a priori. Therefore only random noise corrupts the magnetometer measurements.

Because the gyroscopes and the rate of change of the local magnetic field are sensing the same physical phenomenon, namely the rotation of the device, the fusion of both measurements can be used to improve the correct rotation by calibrating the drifting gyroscopes during the frequent magnetic field quasi-static periods. This is achieved by estimating the time varying gyroscope errors using the magnetic field rate of change measured by magnetometers. As the relationships between these measurements are non-linear, an extended Kalman filter (EKF) technique has been developed for the implementation of one aspect of the invention.

Referring to FIG. 1, a block diagram of the method of the invention is illustrated. Starting from the left of the diagram, it can be seen that the state vector comprises the attitude error in the local level frame and the rate gyroscope in-run bias in the IMU frame. The IMU frame to the local level frame quaternion is propagated using the gyroscope angular rates (i). The magnetometer measurements are analyzed with the quasi-static detector (ii). The detector identifies the periods during which the rate of change of the magnetometer measurements' norm is close to zero. The corresponding magnetically measured rate of change and raw measurements are fed to the update phase of the EKF (iii). These measurements are used for updating the error estimates expressed in the state vector. The derivation of the differential equations relating the measurements to the state vector is based on the small angle approximation of the direction cosine matrices. The updated gyroscope bias vector is used for correcting the next epoch angular rate measurements in a feedback loop. Using the updated attitude error angles, the Euler angles of the IMU in the local level frame are computed. The final output corresponds to the roll, pitch and azimuth angles with their corresponding standard deviations (iv).

Regarding the quasi-static magnetic field detector, this component of one aspect of the invention detects when the magnetic field local to the PND is quasi-static or constant.

The earth's magnetic field, though a good source of information for estimating heading outdoor, suffers severe degradations indoor caused by magnetic field perturbations. These perturbations are of changing magnitudes and directions, which induce random variations in the total magnetic field. These variations render the magnetic field information useless for orientation estimation indoor with respect to the magnetic North. Although the magnetic field indoor is not spatially constant due to changing perturbation sources, depending on the pedestrian's speed and surroundings, it is possible to have locations as well as short periods when the perturbed magnetic field is constant in magnitude as well as direction.

The rate of change of the total magnetic field in such situations will be ideally zero. It is possible to have very slight changes in the magnitude and direction of the total magnetic field (due to sensor noise) that can be considered quasi-static.

The information to be considered for detecting a QSF is the rate of change of the total magnetic field $\dot{B}$. Therefore for a window of size N, a QSF detector will detect static field if $$\{\dot{B}_k\}_{k=n}^{n+N-1} \approx 0. \tag{0.1}$$

Let the hypothesis for non-static field be $H_0$ and that for a quasi-static field be $H_1$ respectively. The Probability Density Functions (PDFs) associated with these two hypotheses are $$f(\dot{B}; H_0) \tag{0.2}$$

$$f(\dot{B}; H_1). \tag{0.2}$$

The rate of change of total magnetic field is also contaminated by white Gaussian noise $v_k$, which when modeled with the measurements gives $$y_k = \dot{B}_k + v_k, \tag{0.3}$$

where $y_k$ is the information to be tested for $H_0$ or $H_1$. $\dot{B}_k$ is the unknown parameter (for $H_0$) required to describe the signal completely. Therefore, for the two hypothesis, $\dot{B}_k$ is defined as $$H_0: \exists k \in \Omega_n \text{ s.t. } \dot{B}_k = 0$$

$$H_1: \forall k \in \Omega_n \text{ then } \dot{B}_k = 0, \tag{0.4}$$

where $\Omega_n = \{l \in \mathbb{R}; n \leq l \leq n+N-1\}$ with $N \in \mathbb{R}$ and $m \in \mathbb{R}$.

As the complete knowledge about $\dot{B}$ is unknown for $H_0$, the PDF in this case is given by $$f(y; B, H_0) = \prod_{k=\Omega_n} \frac{1}{(2\pi\sigma_B^2)^{1/2}} \exp\left(\frac{-1}{2\sigma_B^2}(y_k - B_k)^2\right). \tag{0.5}$$

Let the Maximum Likelihood Estimator (MLE) for the unknown parameter in case of $H_0$ be $\hat{B}_0$, which is given by the mean of the signal as $$\hat{B}_0 = \frac{1}{N} \sum_{k=n}^{n+N-1} y_k. \tag{0.6}$$

Now the PDF for $H_0$ becomes $$f(y; \hat{B}_0, H_0) = \prod_{k \in \Omega_n} \frac{1}{(2\pi\sigma_B^2)^{1/2}} \exp\left(\frac{-1}{2\sigma_B^2}(y_k - \hat{B}_0)^2\right). \tag{0.7}$$

For hypothesis $H_1$, the rate of change of total magnetic field is known (it will be zero), therefore the PDF in this case becomes $$f(y; H_1) = \prod_{k \in \Omega_n} \frac{1}{(2\pi\sigma_B^2)^{1/2}} \exp\left(\frac{-1}{2\sigma_B^2} y_k^2\right). \tag{0.8}$$

The Generalized Likelihood Ration Test (GLRT) for detecting quasi-static field is given by $$\Lambda(y) = \frac{f(y; \hat{B}_0, H_0)}{f(y; H_1)} < \lambda. \tag{0.9}$$

Substituting for the PDFs in Equation (0.9) and simplifying $$\Lambda(y) = \frac{\prod_{k \in \Omega_n} \frac{1}{(2\pi\sigma_B^2)^{1/2}} \exp\left(\frac{-1}{2\sigma_B^2}(y_k - \hat{B}_0)^2\right)}{\prod_{k \in \Omega_n} \frac{1}{(2\pi\sigma_B^2)^{1/2}} \exp\left(\frac{-1}{2\sigma_B^2} y_k^2\right)} < \lambda, \tag{0.10}$$

$$\Lambda(y) = \prod_{k \in \Omega_n} \exp\left(\frac{1}{2\sigma_B^2} y_k^2 - \frac{1}{2\sigma_B^2}(y_k - \hat{B}_0)^2\right) < \lambda, \tag{0.11}$$

$$\Lambda(y) = \prod_{k \in \Omega_n} \exp\left(\frac{1}{2\sigma_B^2} y_k^2 - \frac{1}{2\sigma_B^2} y_k^2 + \frac{2}{2\sigma_B^2} y_k \hat{B}_0 - \frac{1}{2\sigma_B^2} \hat{B}_0^2\right) < \lambda, \tag{0.12}$$

$$\Lambda(y) = \prod_{k \in \Omega_n} \exp\left(\frac{1}{2\sigma_B^2} y_k \hat{B}_0 - \frac{1}{2\sigma_B^2} \hat{B}_0^2\right) < \lambda. \tag{0.13}$$

Taking natural log on both sides, $$\sum_{k \in \Omega_n} \left(\frac{2}{2\sigma_B^2} y_k \hat{B}_0 - \frac{1}{2\sigma_B^2} \hat{B}_0^2\right) < \ln(\lambda), \tag{0.14}$$

$$\sum_{k \in \Omega_n} \left(2 y_k \hat{B}_0 - \hat{B}_0^2\right) < 2\sigma_B^2 \ln(\lambda), \tag{0.15}$$

$$\left(2 \sum_{k \in \Omega_n} y_k \hat{B}_0 - \sum_{k \in \Omega_n} \hat{B}_0^2\right) < 2\sigma_B^2 \ln(\lambda), \tag{0.16}$$

$$\left\{2 \sum_{k \in \Omega_n} y_k \frac{1}{N} \sum_{k \in \Omega_n} y_k - N\left(\frac{1}{N} \sum_{k \in \Omega_n} y_k\right)^2\right\} < 2\sigma_B^2 \ln(\lambda), \tag{0.17}$$

$$\left\{\frac{2}{N}\left(\sum_{k \in \Omega_n} y_k\right)^2 - \frac{1}{N}\left(\sum_{k \in \Omega_n} y_k\right)^2\right\} < 2\sigma_B^2 \ln(\lambda), \tag{0.18}$$

$$\left|\frac{1}{\sqrt{N}} \sum_{k \in \Omega_n} y_k\right| < \gamma, \tag{0.19}$$

where $\gamma = \sqrt{2\sigma_B^2 \ln(\lambda)}$.

Equation (0.19) constitutes the detector for identifying quasi-static total magnetic field in all pedestrian environments.

From the above, it can be seen that, utilizing a statistical signal detection technique known as Likelihood Ratio Test (LRT), the QSF detector is given by $$\left|\frac{1}{\sqrt{N}}\sum_{k\in\Omega_n}y_k\right|<\gamma,\qquad(0.20)$$

where $\gamma$ is the threshold for QSF detection.

Figure 2:
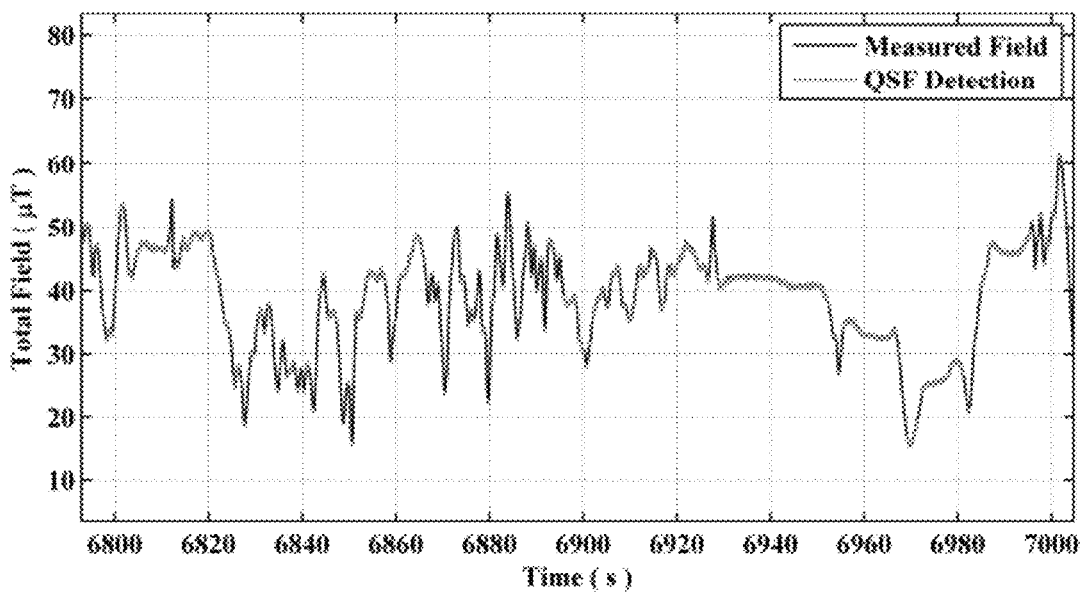
FIG. 2 illustrates an output of a QSF detector, showing that quasi-static periods occur often.

The QSF detector was tested to determine its effectiveness. FIG. 2 depicts the output of the QSF in an indoor environment. The changes in the total magnetic field due to perturbations are obvious. It can be observed that the QSF rejects the majority of the field measurements that are changing rapidly due to perturbations. There are some short QSF periods detected from 6840 s to 6900 s epochs followed by some long duration ones.

Figure 3:
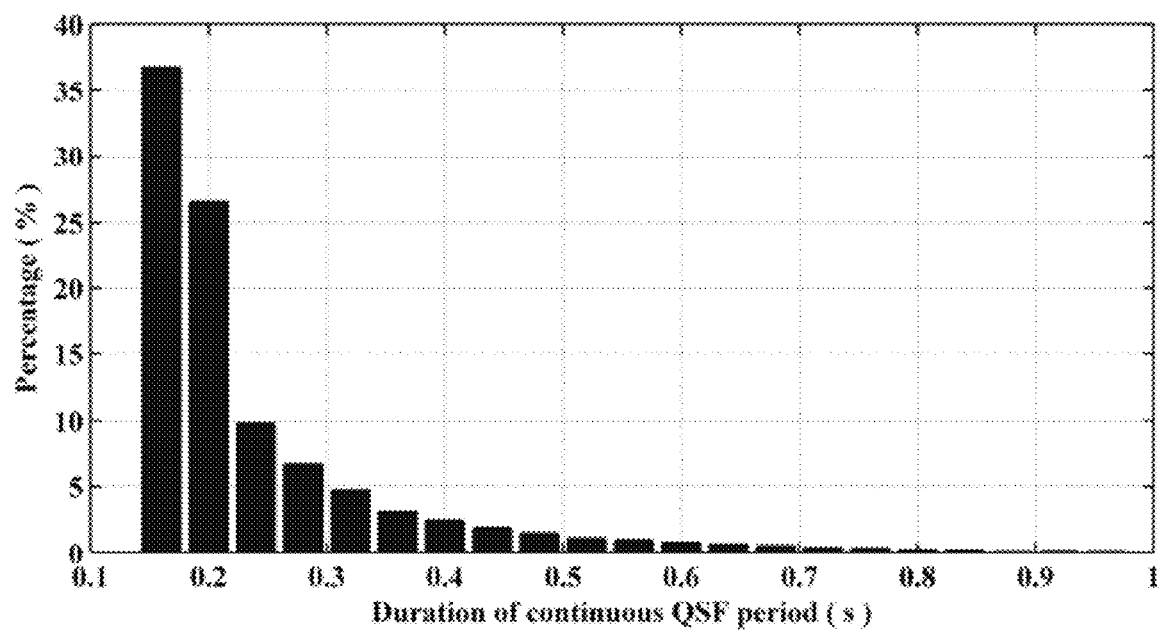
FIG. 3 is a graph showing the occurrence of continuous QSF periods.
Figure 4:
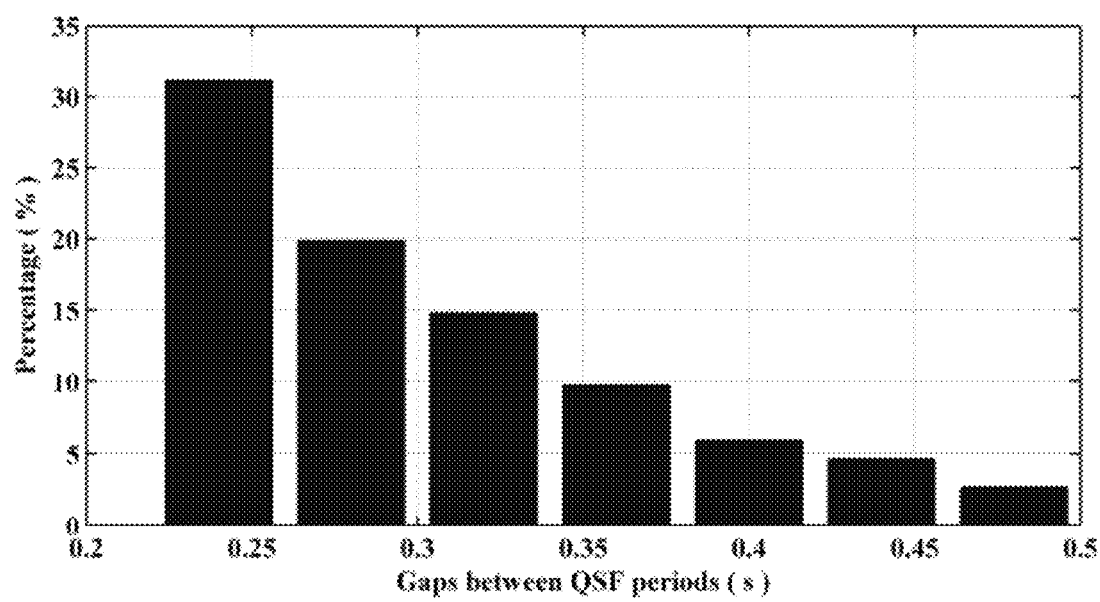
FIG. 4 is a graph showing the duration of gaps between QSF periods.

FIG. 3 summarizes the QSF detection periods and their respective durations for the entire data set (different pedestrian navigation environments). Most of the detection periods are of 120 ms to 300 ms duration. These periods have a frequency much higher than ZUPTs (Zero Velocity Updates). FIG. 4 depicts the shortest and longest gaps between two consecutive QSF periods and their percentages of occurrence respectively. The minimum gap is of 240 ms, which occurs most of the times as compared with the maximum gap of 480 ms. Therefore it can be concluded that the QSF periods are encountered more frequently and hence may allow more updates than the ZUPT approach.

After detection of the quasi-static magnetic field periods, the next step is to use these periods for estimating errors associated with attitude and gyroscopes. For this purpose, an attitude computer and a Kalman filter based error estimator are used.

The attitude is represented as a quaternion, which is then updated using angular rates for attitude estimation. The overall quaternion update can be written as (Farrell 2008)

$$\dot{q}=\frac{1}{2}Q_\omega q \qquad (0.21)$$

where q is the attitude quaternion and $Q_\omega$ is the skew symmetric matrix of the angular rate quaternion given by $$Q_\omega = \begin{bmatrix} 0 & -\omega_x & -\omega_y & -\omega_z \\ \omega_x & 0 & -\omega_z & \omega_y \\ \omega_y & \omega_z & 0 & -\omega_x \\ \omega_z & -\omega_y & \omega_x & 0 \end{bmatrix}. \qquad (0.22)$$

The angular rates utilized for attitude quaternion update are compensated for the biases, i.e.

$\omega_i = \hat{\omega}_i - \delta\omega_i,$ $i = x, y, z$ (0.23)

These biases are obtained from the Kalman filter discussed below.

The attitude and gyroscope errors are considered for the states of the proposed Kalman filter. This allows one to directly relate the impact of quasi-static field detections on attitude and gyroscope error estimation, which is the primary focus of this proposal. The gyroscope model is given by $\hat{\omega} = \omega + \delta\omega + n_\omega,$ (0.24)

where $\omega$ is the true angular rate, $\delta\omega$ is the bias and $n_\omega$ is the white Gaussian noise with Power Spectral Density (PSD) $\sigma_\omega^2$.

Gyroscope bias is modeled as a first order Gauss-Markov process given by $\dot{\delta\omega} = -\beta\delta\omega + n_{\omega b},$ (0.25)

where $1/\beta$ is the correlation time and $n_{\omega b}$ is white Gaussian noise with PSD $\sigma_{\omega b}^2$.

The overall state vector dynamics model is given by $$\begin{bmatrix} \dot{\varepsilon} \\ \dot{\delta\omega} \end{bmatrix} = \begin{bmatrix} 0 & -\hat{R}_b^n \\ 0 & -\beta \end{bmatrix} \begin{bmatrix} \varepsilon \\ \delta\omega \end{bmatrix} + \begin{bmatrix} 0 & -\hat{R}_b^n \\ I & 0 \end{bmatrix} \begin{bmatrix} n_\omega \\ n_{\omega b} \end{bmatrix}. \qquad (.26)$$

Here $\varepsilon$ is the attitude error expressed in the local level frame and given by $\varepsilon = [\varepsilon_\phi \ \varepsilon_\theta \ \varepsilon_\psi]^T$, $\delta\omega$ is the gyroscope bias given by $\delta\omega = [\delta\omega_x \ \delta\omega_z \ \delta\omega_z]^T$ and $\hat{R}_b^n$ is the transformation matrix from the body to the local level frame, namely the navigation frame, which is obtained from the attitude quaternion. Equation (0.26) is of the form $\dot{\delta x} = F\delta x + Gw.$ (0.27)

In order to implement this model in discrete time, the discrete time equivalents of system dynamics (transition matrix) and process noise are needed.

The transition matrix is given by $\Phi = I + F\Delta t + F^2 \Delta t^2/2! + \ldots.$ (0.28)

The discrete time process noise matrix is given by $Q_d = \int \Phi G Q G^T \Phi^T dt.$ (0.29)

Both Equations (0.28) and (0.29) need to be implemented at the propagation rate as these are time variant.

In order to observe the errors associated with attitude and sensors, a measurement model which utilizes the quasi-static magnetic field measurements is derived.

Let the magnetic field measurement in the body frame at start of quasi-static field period be given by $F_1^b = [B_x B_y B_z]^T.$ (0.30)

Considering the attitude at start of quasi-static period as the reference for this measurement model, the magnetic field measurement can be transformed using $F_{QSF}^n = R_b^n F_1^b.$ (0.31)

For the quasi-static field periods, $F_{QSF}^n$ is considered as a measurement. As the inaccuracies in the sensor will cause errors in the estimated attitude, the transformations of proceeding magnetic field measurements from the body frame to the navigation frame using the updated $R_b^n$ would be different from $F_{QSF}^n$ hence causing the measurement error. This gives the relationship for first measurement error model.

$\delta F_{QSF}^n = F_{QSF}^n - \hat{F}_{QSF}^n.$ (0.32)

Substituting for $\hat{F}_{QSF}^n$ in Equation (0.32) using the magnetic field measurement at proceeding QSF epoch ($\hat{F}_2^b$) and attitude quaternion update, one gets $\delta F_{QSF}^n = F_{QSF}^n - \hat{R}_b^n \hat{F}_2^b.$ (0.33)

$\hat{R}_b^n$ is composed of the attitude at start of QSF period along with some perturbations due to gyroscope errors given by $$\hat{R}_b^n = (I - E)R_b^n, \qquad (.34)$$

$$\text{where } E = \begin{bmatrix} 0 & -\varepsilon_\psi & \varepsilon_\theta \\ \varepsilon_\psi & 0 & -\varepsilon_\phi \\ -\varepsilon_\theta & \varepsilon_\phi & 0 \end{bmatrix}.$$

Equation (0.33) now becomes $\delta F_{QSF}^n = F_{QSF}^n - (I-E)R_b^n(F_2^b + n_F).$ (0.35)

Simplifying Equation (0.35)

$$\delta F_{QSF}{}^n = F_{QSF}{}^n - (R_b - E R_b{}^n)(F_2{}^b + n_F), \quad (0.36)$$

$$\delta F_{QSF}{}^n = F_{QSF}{}^n - F_{QSF}{}^n - R_b{}^n n_F + E R_b{}^n F_2{}^b E R_b{}^n n_F. \quad (0.37)$$

The last term in Equation (0.37) is second order in errors, therefore it can be neglected.

$$\delta F_{QSF}{}^n = E F_{QSF}{}^n = R_b{}^n n_F, \quad (0.38)$$

$$\delta F_{QSF}^n = -[F_{QSF}^n \times]\varepsilon - R_b^n n_F, \quad (.39)$$

where $[F_{QSF}^n \times] = \begin{bmatrix} 0 & -B_z^{QSF} & B_y^{QSF} \\ B_z^{QSF} & 0 & -B_x^{QSF} \\ -B_y^{QSF} & B_x^{QSF} & 0 \end{bmatrix}$.

From Equation (0.39), the QSF measurement error model becomes $$\delta F_{QSF}^n = [-[F_{QSF}^n \times] 0]\begin{bmatrix} \varepsilon \\ \delta\omega \end{bmatrix} - \begin{bmatrix} R_b^n & 0 \\ 0 & 0 \end{bmatrix}\begin{bmatrix} n_F \\ 0 \end{bmatrix}. \quad (.40)$$

During the quasi-static field periods, the rate of change of reference magnetic field is zero. This information can be used as a measurement.

$$F_{QSF}{}^n = R_b{}^n F_1{}^b, \quad (0.41)$$

$$R_n{}^b F_{QSF}{}^n = F_1{}^b. \quad (0.42)$$

Taking the derivative of Equation (0.42) to get the relationship between rate of change of a vector in two different frames, one gets $$R_n{}^b \dot{F}_{QSF}{}^n = \dot{F}_1{}^b + \omega F_1{}^b. \quad (0.43)$$

where $\omega = [\omega_x\ \omega_y\ \omega_z]^T$ is the angular rate expressed in the body frame. Also $\dot{F}_{QSF}{}^n$, being expressed in the navigation frame, is equal to zero during QSF periods. Therefore Equation (0.43) becomes $$\dot{F}_1{}^b = -\omega \times F_1{}^b. \quad (0.44)$$

During user motion, the magnetic field components in body frame will encounter changes, which follows Equation (0.44). But, due to errors in gyroscopes, the predicted changes in magnetic field will be different from the measured ones given by $$\delta \dot{F}^b = \dot{F}_2{}^b + \dot{\tilde{F}}_2{}^b, \quad (0.45)$$

where $$\dot{F}_2^b = \frac{1}{\Delta t}(F_2^b - F_1^b).$$

Expanding Equation (0.45) and substituting from Equation (0.44)

$$\delta \dot{F}^b = \dot{F}_2{}^b \times \hat{\omega} \times (F_2{}^b + n_F) \quad (0.46)$$

$$\delta \dot{F}^b = \dot{F}_2{}^b + (\omega + \delta\omega) \times (F_2{}^b + n_F) \quad (0.47)$$

$$\delta \dot{F}^b = \dot{F}_2{}^b + \omega \times F_2{}^b + \delta\omega \times F_2{}^b + \hat{\omega} \times n_F. \quad (0.48)$$

First two terms give the rate of change of reference magnetic field, which during QSF periods is zero. Thus Equation (0.48) reduces to $$\delta \dot{F}^b = \delta\omega \times F_2{}^b + \hat{\omega} \times n_F, \quad (0.49)$$

which can be rewritten as $$\Delta \dot{F}^b = -[F_2{}^b \times]\delta\omega + [\hat{\omega} \times]n_F \quad (0.50)$$

giving the following measurement model.

$$\delta \dot{F}^b = [0 - [F_2^b \times]]\begin{bmatrix} \varepsilon \\ \delta\omega \end{bmatrix} + \begin{bmatrix} 0 & 0 \\ 0 & [\hat{\omega} \times] \end{bmatrix}\begin{bmatrix} 0 \\ n_F \end{bmatrix}. \quad (.51)$$

Combining the two measurement error models, one gets $$\begin{bmatrix} \delta F_{QSF}^n \\ \delta \dot{F}^b \end{bmatrix} = \begin{bmatrix} -[F_{QSF}^n \times] & 0 \\ 0 & -[F_2^b \times] \end{bmatrix}\begin{bmatrix} \varepsilon \\ \delta\omega \end{bmatrix} + \begin{bmatrix} -R_b^n \\ [\hat{\omega} \times] \end{bmatrix}n_F, \quad (.52)$$

which constitutes the quasi-static field measurement updates for the Kalman filter. For clarity, in Equation (0.52), $F_{QSF}{}^n$ is the magnetic field vector at the beginning of quasi-static field period, $F_2{}^b$ is the magnetic field vector at present epoch, $\dot{F}^b$ is the magnetic field gradient and $n_F$ is the magnetic field sensor noise.

The above error models can thus be used to compensate for inherent gyroscope errors. In one implementation, the invention was practiced on one device using a set of motion sensors (including a rate gyroscope for sensing the rotational rate of the device around one of the axes of the device) and a magnetometer for sensing the magnetic field along the three axes of the device. Of course, multiple motion sensors may be used along with multiple magnetometers. The rotational rate sensor may be a consumer grade MEMS (Micro Mechanical System) rate gyroscope used in smartphones or portable tablet computers. The magnetic field sensor may be any magnetometer, anything from high sensitivity fluxgate magnetometers to a consumer grade Anisotropic Magneto-resistive magnetometer.

Figure 5:
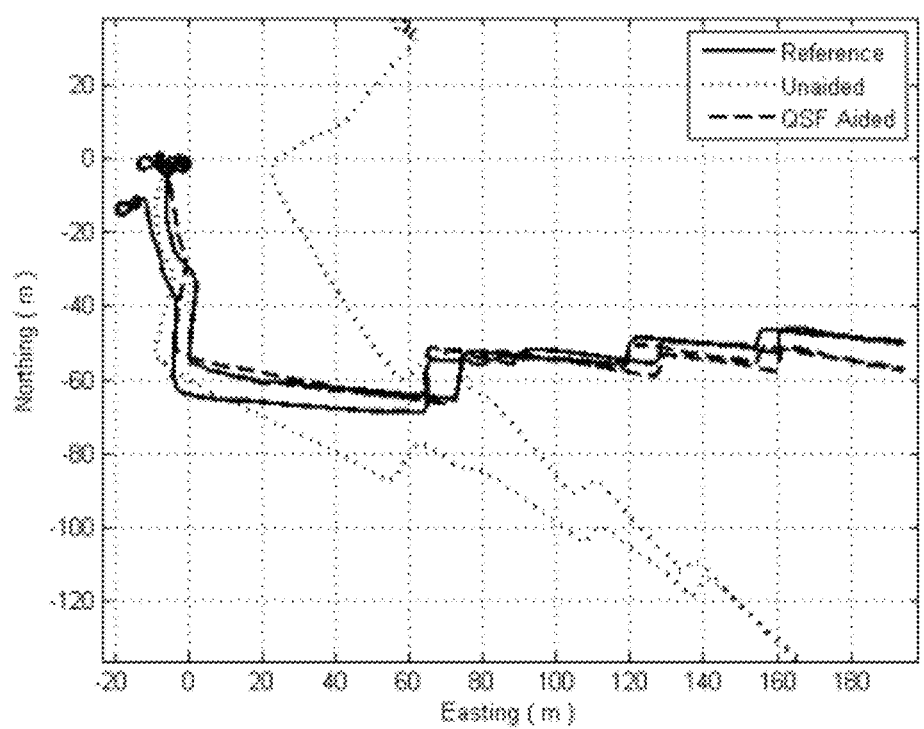
FIG. 5 illustrates the results of experimental use of the invention, showing trajectory accuracy gains due to the invention.

In terms of test results, more than seven km of magnetic field data were collected over a cumulated period of 2.5 hours in different indoor environments by a pedestrian holding consumer grade magnetic and rate gyroscope sensors and a highly accurate reference sensor. The data, analyzed for quasi-static field periods during which the magnetic field, perturbed or unperturbed, is constant showed frequent occurrences of these periods. Most of the gaps between consecutive quasi-static periods were found to be less than one second with a few of the order of ten seconds. The trajectory results, illustrated in FIG. 5, show that the present invention successfully estimates the gyroscope errors and provides a better estimate of attitude angles. These gyroscope errors and estimates of attitude angles, upon translation into the position domain, give a better trajectory estimate than a system unaided by the invention. It was found that the trajectory accuracy improved by 90% using the present invention, as compared to the unaided estimation technique used currently by other devices.

It should be noted that the present invention has a number of advantages over the prior art. Specifically, the present invention provides new magnetically derived measurements, namely rates of change of the magnetic field during periods of quasi-static magnetic field, for gyroscope drift estimation.

The present invention is also independent from the orientation of the IMU relative to some known reference frame.

Finally, the present invention works in all environments, even if the Earth's magnetic field is perturbed by sources generating an artificial magnetic field.

The system of the invention offers the benefit of being able to compensate for the errors of handheld gyroscope sensors in the indoors using only onboard magnetic field and angular rate measurements. Being immune to local magnetic perturbations, it can be used in any type of buildings, urban areas or other pedestrian navigation environments.

To test the performance of one implementation of the invention, data was collected using the NavCube, an advanced multi-sensor data collection unit. Two Analog Devices ADIS16488 units were used. Table I provides the specifications of the IMU and magnetometers performance. The ADIS16488 contains an IMU, magnetometer and barometer, although the barometer was not used in this study. The IMU data was logged at 200 Hz and the magnetometer data at 100 Hz, but down sampled to 25 Hz for processing. One unit was located on a backpack used to carry the reference system and the other was strapped to a left ankle of the person wearing the backpack. The course trajectory consisted of a 45-minute walk on the University of Calgary campus. This included time inside and beside buildings, athletic field environments and building basements. Since the purpose was to assess the QSF update performance, GPS data was only used for one second at the beginning to provide an initial position, thus all results are presented without the use of GPS.

TABLE 1

| IMU Specification | ADIS16488 |
|---|---|
| Nonlinearity | 0.01% |
| In Run Bias Stability | 6.25°/hr |
| Angular Random Walk | 0.3°/√hr |
| Rate Noise Density | 0.24°/s/√Hz |
| Mag Noise | 0.00045 Gauss |

A NovAtel SPAN system including an LCI IMU and a SPAN SE receiver collected data that was post processed to provide a reference trajectory and attitude. The reference system allowed a direct analysis of the attitude and an optimal calibration for the two ADIS16488 units mounted on the backpack. The ankle mounted unit is analyzed in the position domain, since the position errors are well bounded by the application of zero velocity updates. The ankle-mounted magnetometer was calibrated using a field norm described in V. Renaudin, H. Afzal, and G. Lachapelle, "Complete tri-axis magnetometer calibration in the magnetic domain," *Journal of Sensors, Hindawi*, vol. 2010, p. 10, 2010.

The data was processed in an INS filter that estimates position, velocity, attitude, gyro biases and scale factors, accelerometer biases and scale factor. For the ankle-mounted unit, zero velocity updates are applied during the stance phase. Details of the filter are provided in J. B. Bancroft, M. H. Afzal, and G. Lachapelle, "High Performance GNSS Augmented Pedestrian Navigation in Signal Degraded Environments," in *International Global Navigation Satellite Systems Society (IGNSS) Symposium* 2011, Sydney, Australia, 2011.

Figure 6:
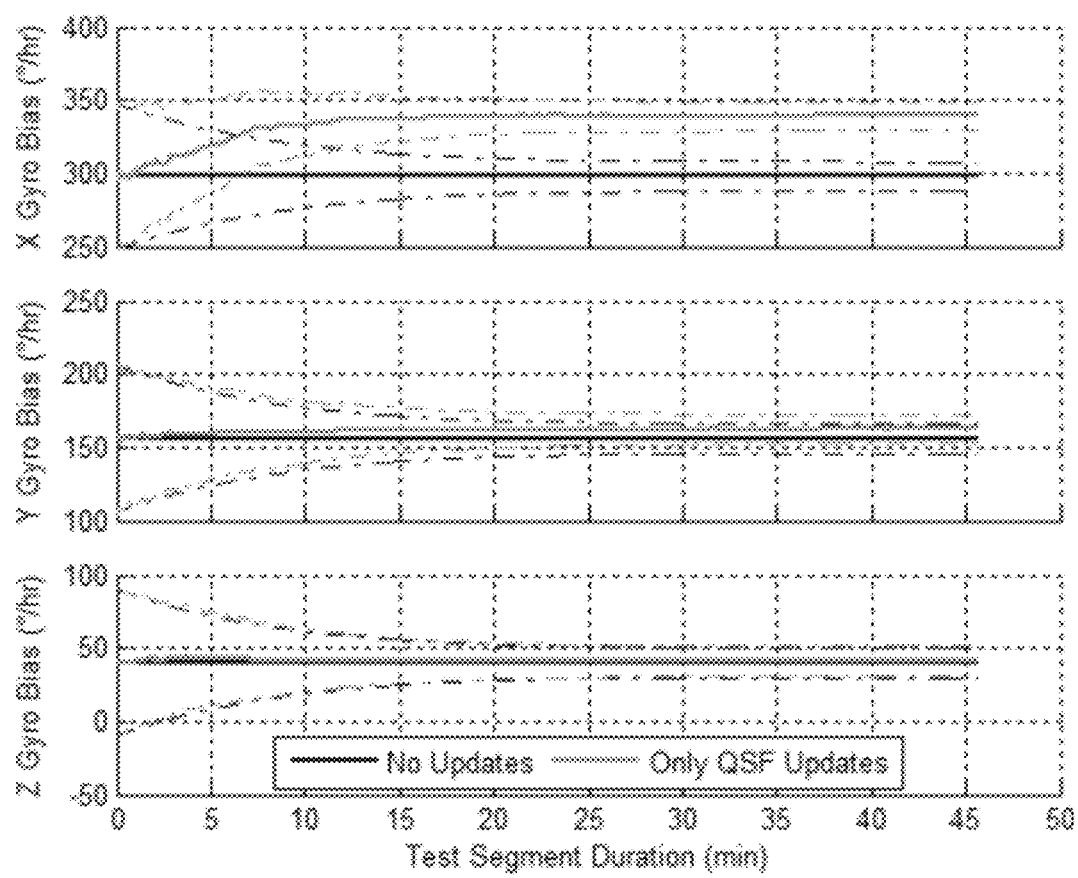
FIG. 6 illustrates bias estimation comparison data when QSF updates are applied and not applied.

FIG. 6 shows the bias estimation of the backpack mounted unit. No other updates are provided to the filter so the bias value remains unchanged without QSF. The estimated standard deviation does however reduce over time due to user dynamics from both true and perceived noise dynamics. When QSF updates are applied the filter converges to biases within the first 10 minutes. It is apparent from the convergence time that the update does not provide a large amount of information to the gyro bias, but over an extended period of time does provide valuable information. Initially, the gyro biases had a 50°/hr standard deviation that was determined from a short period when the user stood still. Thus if the estimated variance was larger for a lower cost IMU, the update would converge faster, implying that the update is more suited to lower performing gyros.

Figure 7:
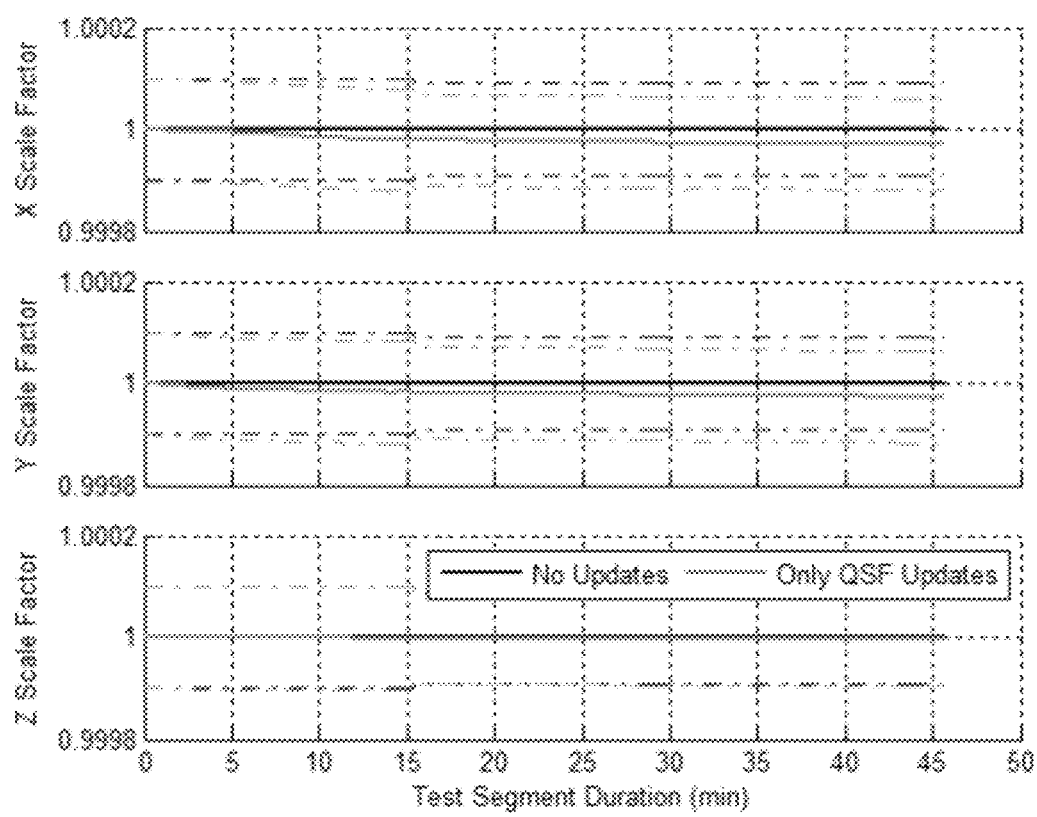
FIG. 7 shows data for the estimation of gyroscopic scale factor errors.

The rate gyro scale factor estimation is shown in FIG. 7. The gyro used has a very small scale factor (0.01%), thus the deviation from unity should be minor. The scale factor does move toward its true value, but at a slower rate than the gyro bias. In addition, the estimated variance of the scale factor does not decrease over the 45 minute test duration, indicating that observability at the 0.01% level is extremely low and that QSF updates are likely more effective for gyros with higher scale factors.

Figure 8:
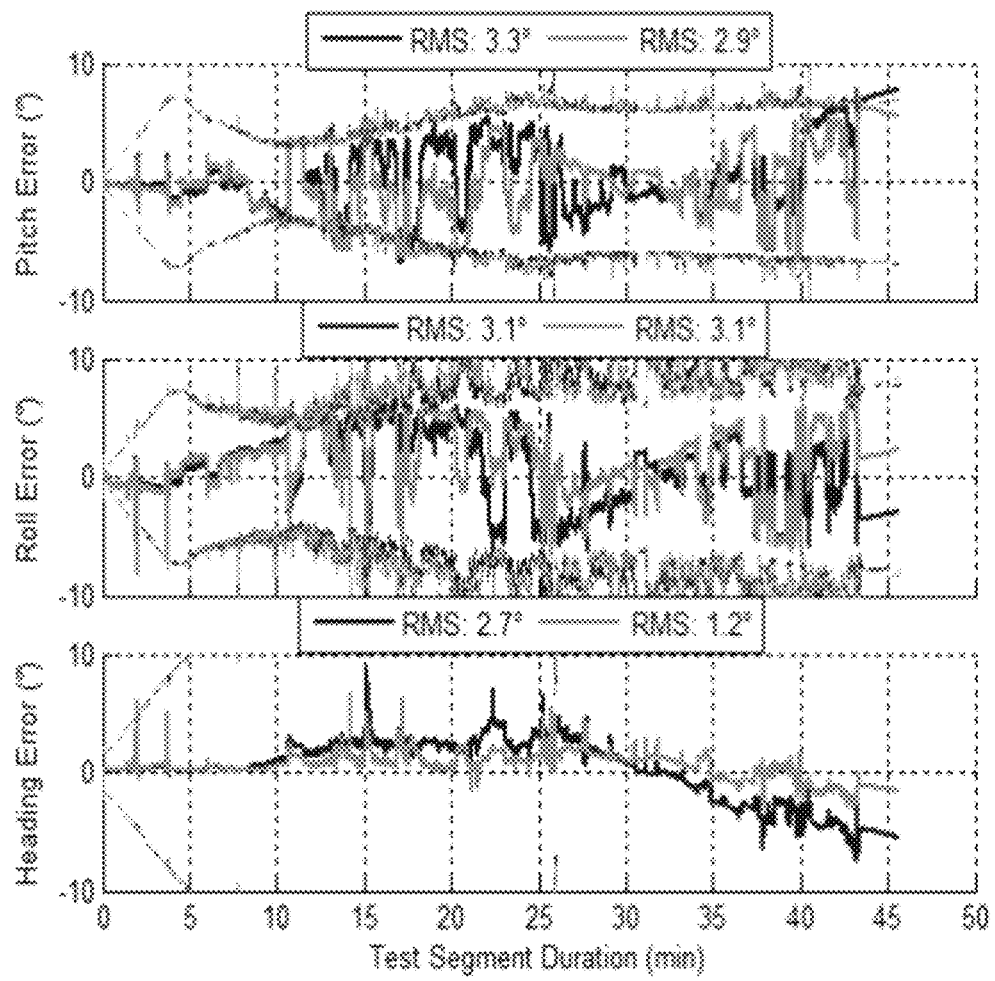
FIG. 8 illustrates graphs that show attitude errors when QSF updates are applied and not applied.

FIG. 8 shows the attitude errors of the backpack mounted sensor pod. The heading error RMS was reduced by 56% when QSF updates were applied, and there is minor improvement to the pitch and roll errors. As the attitude error is still within a few degrees, the QSF update is still not sufficient to maintain attitude at a level within which the position could be determined by integrating acceleration measurements. However, for attitude and heading reference systems (AHRS) or pedestrian navigation based on heading and step length, a 1.2° RMS value is advantageous.

Figure 9:
FIG. 9 is a mapping of trajectory taken when testing one aspect of the invention.

Magnetic QSF periods can be detected in any perturbed environment but vary depending on the location of the body-mounted magnetometer. FIG. 9 shows the QSF periods for the backpack-mounted unit in a close up view of the northwest corner of FIG. 10. Green points indicate an accepted QSF update and red points indicate an update that was rejected by the filter through a fault detection and exclusion (FDE) process. While outdoor QSF updates are normally available, it is apparent that there are areas where the field's magnitude does not remain constant. Indoors, there are typically updates every few seconds. The average time between updates and the number of QSF periods detected and used are provided in Table II.

TABLE II

|  | Backpack | Ankle Mounted |
|---|---|---|
| Mean | 0.07 s | 0.34 s |
| Max | 7.20 s | 20.2 s |
| Median | 0.04 s | 0.16 s |
| QSFs Detected | 38107 | 8102 |
| QSFs Used in Solution | 33142 (87%) | 5921 (73%) |

The ankle unit experiences 79% less QSF periods than the backpack. The FDE rejection rate on the backpack was 13% while on the ankle it was 27%. The increase in the rejection rate results from higher angular acceleration on the ankle during the QSF period compared to that of the backpack. This results in a larger variation in the angular velocity during the QSF periods and makes the filter innovations larger. Although the ankle unit both has a lower number of QSF detections and a higher rejection rate, it still improves the navigation solution as shown below.

Figure 11:
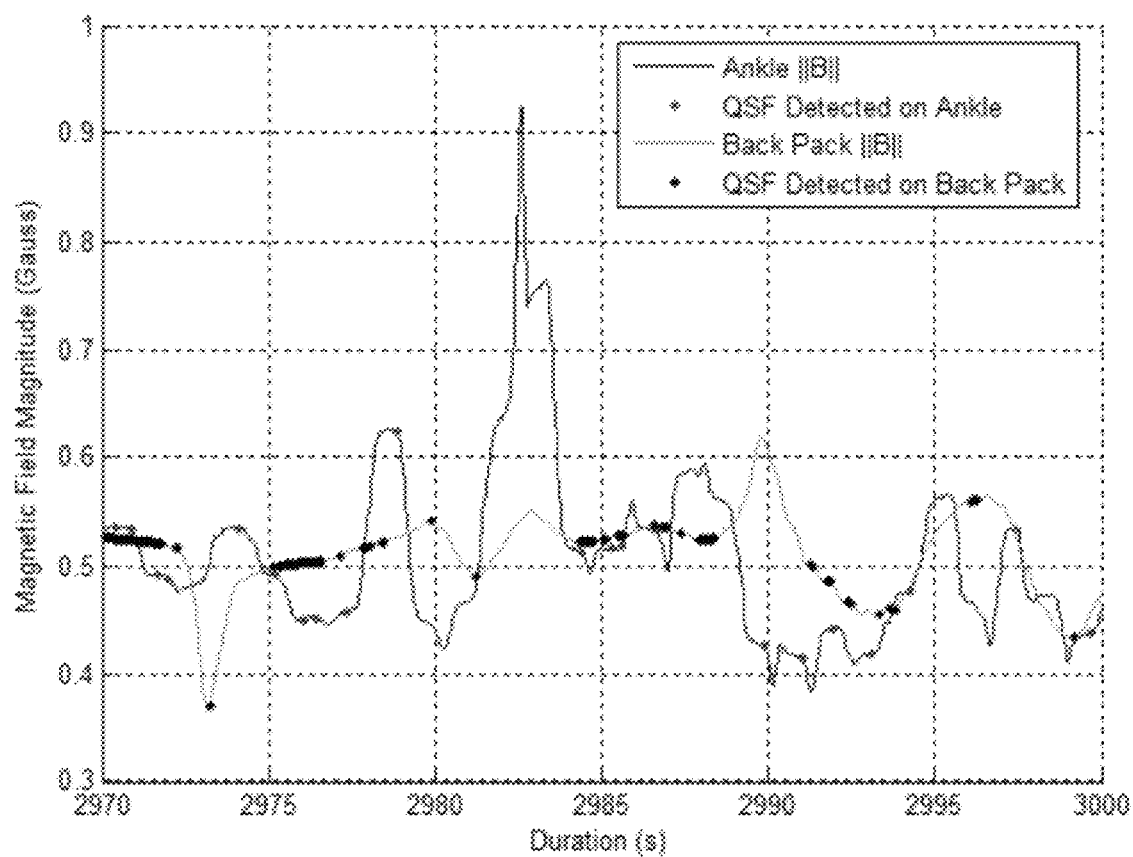
FIG. 11 shows magnetic field magnitude and detected QSF periods gathered when one implementation of the invention was being tested.

FIG. 11 provides an example of instances indoors where the magnetic field magnitude is rapidly changing but QSF periods are still detected. Note that at this location the earth magnetic field strength is 0.568 Gauss, and updates are used when the field strength is above 0.6 and below 0.5 Gauss. The ankle and backpack units detect periods both at the same epochs and at different epochs. It is important to consider that the field's rate of change is a function of user dynamics and thus one would expect less to occur on the ankle then on the backpack. Additionally, the ankle magnetometer is closer to the ferrous objects used in reinforced concrete. This explains why the FDE rejection rate on the ankle mounted unit is higher.

Figure 10:
FIG. 10 is a larger map illustrating various trajectories taken when the invention was used and trajectories taken when the invention was not used.
Figure 12:
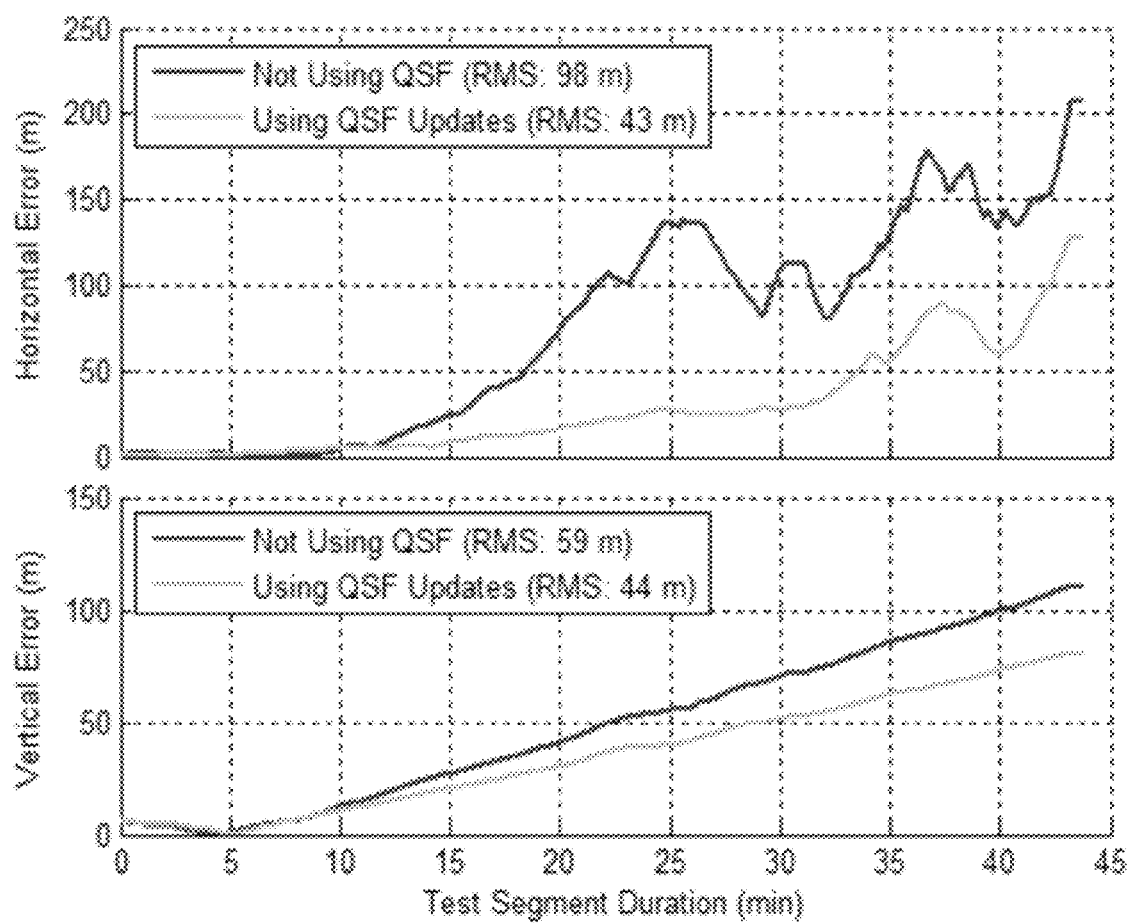
FIG. 12 illustrates data showing errors of an ankle mounted GPS system with and without QSF updates.

The use of Zero Velocity Updates (ZUPTs) on the ankle unit results in navigation capability when GPS id denied. QSF updates applied to the GPS denied filter improved the navigation accuracy by 56% (RMS) and the maximum error at the end of the 45 minute test decreased from 208 m to 128 m. An error profile of the two trajectories is shown in FIG. 12 and a map view is shown in FIG. 10.

It is apparent from the map view that the heading of the system drifts over time at a faster rate than when the QSF updates are applied (red vs. orange lines). Without QSF updates it took 18.5 minutes to reach a 50 m horizontal error, whereas with QSF it took 33.5 minutes. With the QSF applied the last 10 minutes contained the largest heading error which also corresponds to a low number of QSF updates (i.e. the user was inside for longer periods of time). The vertical error also shows a modest improvement. The maximum elevation error without QSF was 110 m, while it was 81 m when QSF updates were applied, a 26% percent improvement. The use of the barometer sensors in the ADI units would of course further improve vertical accuracy.

Figure 13:
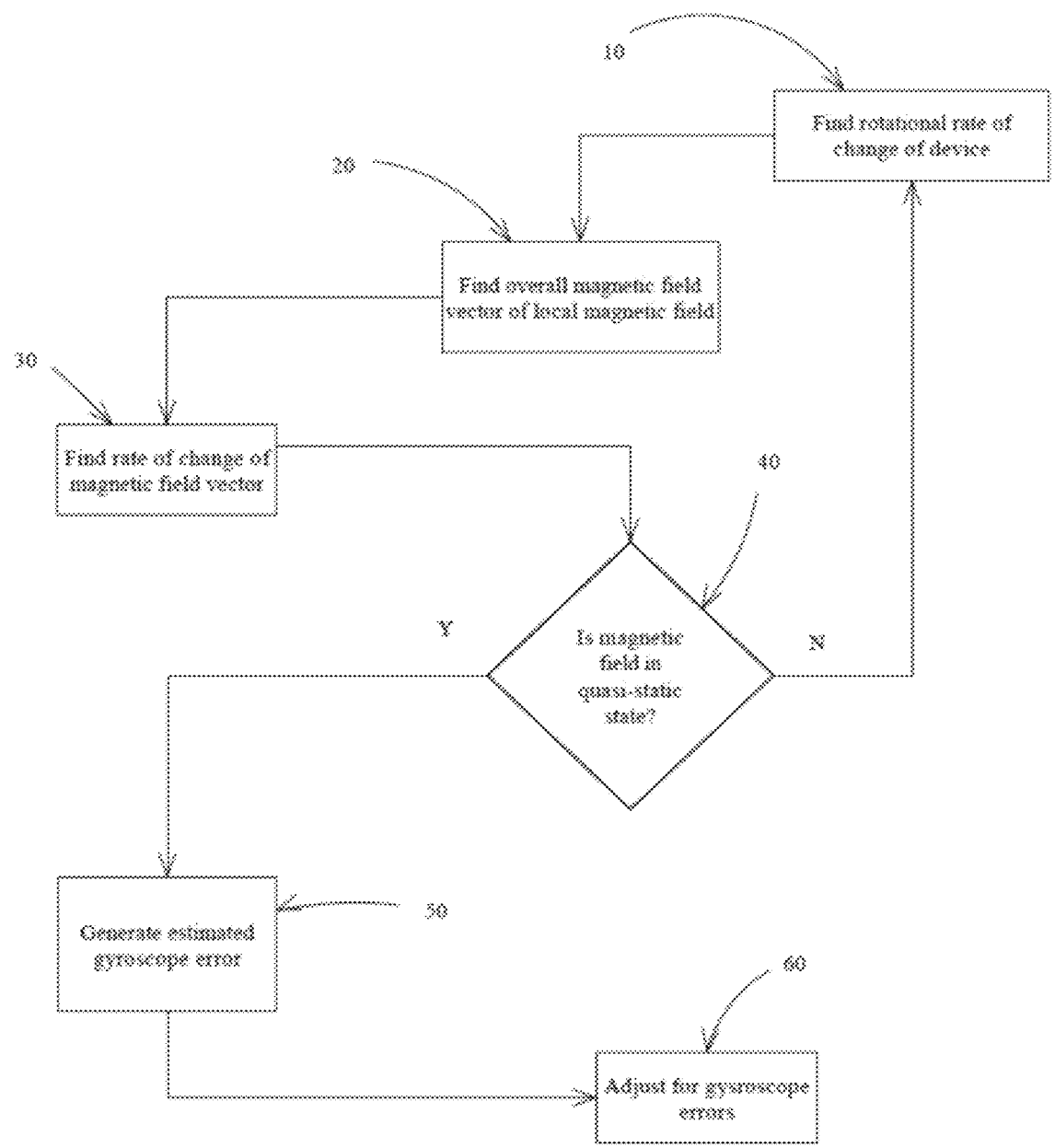
FIG. 13 is a flowchart detailing the steps in a method according to one aspect of the invention.

The method steps of the invention can be summarized as shown in the flowchart of FIG. 13. As noted above, the invention may be practiced on a personal navigation device using a number of gyroscopic sensors and at least one magnetometer.

Referring to FIG. 13, the method starts with step 10. Step 10 that of finding the rotational rate of change of the device around at least one of the device's 3 axes. This can be done using the gyroscopic sensors.

Step 20 then determines the overall magnetic field vector of the magnetic field local to the device. As noted above, this can be done using the at least one magnetometer.

Once the overall magnetic field has been determined, step 30 then checks the rate of change of this magnetic field vector. Once this has been determined, step 40 checks if the rate of change of the magnetic field vector shows that the magnetic field is in a quasi-static state.

If the magnetic field is in a quasi-static state, step 50 then generates the estimated gyroscope errors using the rate of change of the magnetic field vector and the rotational rate of change of the device. This is done using the error models derived above.

The estimated gyroscope errors can then be used (step 60) to adjust the headings to compensate for the errors. The various steps can then be re-executed in as many iterations as desired to continually compensate for the various time-varying gyroscope errors.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g. "C") or an object oriented language (e.g. "C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A method for compensating for errors in a mobile gyroscope in a device, the method comprising:
   a) measuring, by way of at least one set of motion sensors, a rotational rate of change of said device around at least one axis;
   b) measuring, by way of at least one magnetometer, an overall magnetic field vector of a magnetic field local to said device;
   c) calculating, by way of a processor, a rate of change of said magnetic field vector based on measurements from step b);
   d) determining, by way of said processor, if said magnetic field is unchanging based on calculations from step c);
   e) in the event said magnetic field is unchanging, estimating, by way of said processor, estimated gyroscope errors using said rate of change of said magnetic field vector calculated in step c) and said rotational rate of change of said device measured in step a); and f) changing a navigational trajectory of said device based on said estimated gyroscope errors to thereby compensate for gyroscope errors.

2. A method according to claim 1 further comprising step g) continuously repeating steps a)-f) to account for time-varying gyroscope errors.

3. A method according to claim 1 wherein step d) comprises determining, by way of said processor, when a rate of change of magnetic field strength measurements is close to zero.

4. A method according to claim 3 wherein step d) further comprises determining, by way of said processor, a norm for said rate of change of said magnetic field vector for a predetermined time window.

5. A method according to claim 4 wherein step d) further comprises determining, by way of said processor, a rate of change for said norm to determine if said magnetic field local to said device is constant.

6. A method according to claim 1 wherein step e) comprises combining, by way of said processor, components of said rate of change of said magnetic field vector and said rotational rate of change of said device to generate said estimated gyroscope errors.

7. A method according to claim 6 wherein said step of combining is performed using an extended Kalman filter to generate said estimated gyroscope errors.

8. A method according to claim 1 wherein step e) comprises comparing, by way of said processor, said rate of change of said magnetic field vector with said rotational rate of change to result in said estimated gyroscopic errors.

9. A method according to claim 1 wherein said at least one set of motion sensors comprises at least one consumer grade rate gyroscope.

10. A method according to claim 1 wherein said at least one magnetometer comprises at least one anisotropic magnetoresistive magnetometer.

11. A method for determining errors in a gyroscope in a non-static device, the method comprising:
  a) determining, by way of at least one magnetometer, at least two periods of time when a total local magnetic field is unchanging;
  b) for each of said at least two periods of time, measuring, by way of said at least one magnetometer, a magnetic field vector for said magnetic field and a rate of change of said magnetic field vector;
  c) for each of said at least two periods of time, measuring, by way of at least one set of motion sensors, a rotational rate of change for said device;
  d) using an extended Kalman filter to estimate errors in readings from said gyroscope using the rate of change of said magnetic field vector determined in step b) and said rotational rate of change for said device; and
  e) changing a navigational trajectory of said non-static device based on said errors estimated in step d).

12. A method according to claim 11 wherein said method is continuously repeated to continuously determine said errors in said readings from said gyroscope.

13. A method according to claim 11 wherein said method is executed on a personal navigation device.

14. A method according 11 wherein said total local magnetic field is unchanging when a rate of change of magnetic field strength measurements for said local magnetic field is close to zero.

15. A non-transitory computer readable media having encoded thereon computer readable instructions which, when executed, implements a method for compensating for errors in a handheld gyroscope in a device, the method comprising:
  a) measuring, by way of at least one set of motion sensors, a rotational rate of change of said device around at least one axis;
  b) measuring, by way of at least one magnetometer, an overall magnetic field vector of a magnetic field local to said device;
  c) calculating, by way of a processor, a rate of change of said magnetic field vector based on measurements from step b);
  d) determining, by way of a processor, if said magnetic field is unchanging based on calculations from step c);
  e) in the event said magnetic field is unchanging, estimating, by way of a processor, estimated gyroscope errors using said rate of change of said magnetic field vector calculated in step c) and said rotational rate of change of said device measured in step a); and
  f) changing a navigational trajectory of said device based on said estimated gyroscope errors to thereby compensate for gyroscope errors.

* * * * *